(12) United States Patent
Matza et al.

(10) Patent No.: US 9,567,242 B2
(45) Date of Patent: Feb. 14, 2017

(54) PROCESS FOR DECONTAMINATION OF HAZARDOUS SULFUR COMPOUNDS IN OILFIELD PRODUCED WATERS

(75) Inventors: Stephen D. Matza, Sugar Land, TX (US); Martha T. Smith, Friendswood, TX (US)

(73) Assignee: United Laboratories International, LLC, Houston, TX (US)

( * ) Notice: Subject to any disclaimer, the term of this patent is extended or adjusted under 35 U.S.C. 154(b) by 1030 days.

(21) Appl. No.: 13/290,624

(22) Filed: Nov. 7, 2011

(65) Prior Publication Data

US 2012/0118804 A1    May 17, 2012

Related U.S. Application Data

(60) Provisional application No. 61/413,640, filed on Nov. 15, 2010.

(51) Int. Cl.
    *C02F 1/28*    (2006.01)
    *B01J 20/06*   (2006.01)
    (Continued)

(52) U.S. Cl.
    CPC ............ *C02F 1/281* (2013.01); *B01J 20/06* (2013.01); *B01J 20/28045* (2013.01);
    (Continued)

(58) Field of Classification Search
    CPC ............ C02F 1/281; C02F 1/28; C02F 1/00; C02F 2101/101; C02F 2101/10; C02F 2101/00; C02F 2209/26; C02F 2209/00; C02F 2303/16; C02F 2303/00; C02F 2101/40; C02F 2101/30; C02F 1/24; C02F 2103/365; C02F 2103/36; C02F 2103/34; C02F 2103/00; C02F 1/70; B01J 20/3236; B01J 20/3234; B01J 20/3231; B01J 20/32; B01J 20/30; B01J 20/00; B01J 20/3206; B01J 20/3202; B01J 20/3204; B01J 20/28045; B01J 20/28042; B01J 20/28014; B01J 20/28; B01J 20/06; B01J 20/02; B01J 20/3433; B01J 20/34; B01J 20/3475; B01J 20/345; B01J 2220/62
    (Continued)

(56) References Cited

U.S. PATENT DOCUMENTS 4,311,680 A    1/1982    Frech et al.
4,501,668 A    2/1985    Merk et al.
(Continued)

FOREIGN PATENT DOCUMENTS

| JP | 06160368 | 6/1994 |
|---|---|---|
| WO | 2010025452 A1 | 3/2010 |
| WO | 2010045562 A2 | 4/2010 |

OTHER PUBLICATIONS

European Search Report for Application No. 11188977.0 dated Nov. 14, 2012.
(Continued)

*Primary Examiner* — David C Mellon
*Assistant Examiner* — Liam Royce
(74) *Attorney, Agent, or Firm* — Tumey L.L.P.

(57) ABSTRACT

A system and method treat oilfield produced water by two-stages of hazardous sulfide treatments. In an embodiment, a two-stage oil and gas field produced water treatment system includes an oil removal vessel. The oilfield produced water is introduced to the oil removal vessel. The oil removal vessel removes a portion of the hydrocarbons from the oilfield produced water to provide a reduced oil produced water. In addition, the system includes an iron sponge. The reduced oil produced water is introduced to the iron sponge, and the iron sponge removes a portion of the
(Continued)

hazardous sulfides from the reduced oil produced water to provide a reduced sulfide produced water. The system also includes a stabilized sodium percarbonate solution. The stabilized sodium percarbonate solution is mixed with the reduced sulfide produced water to remove a portion of the hazardous sulfides from the reduced sulfide produced water to provide a treated produced water.

7 Claims, 1 Drawing Sheet

(51) Int. Cl.
| | |
|---|---|
| *B01J 20/34* | (2006.01) |
| *B01J 20/32* | (2006.01) |
| *C02F 103/36* | (2006.01) |
| *C02F 1/70* | (2006.01) |
| *C02F 1/24* | (2006.01) |
| *C02F 101/10* | (2006.01) |
| *B01J 20/28* | (2006.01) |

(52) U.S. Cl.
CPC ....... *B01J 20/3204* (2013.01); *B01J 20/3206* (2013.01); *B01J 20/3236* (2013.01); *B01J 20/3433* (2013.01); *B01J 20/3475* (2013.01); *B01J 2220/62* (2013.01); *C02F 1/24* (2013.01); *C02F 1/70* (2013.01); *C02F 2101/101* (2013.01); *C02F 2101/40* (2013.01); *C02F 2103/365* (2013.01); *C02F 2209/06* (2013.01); *C02F 2209/26* (2013.01); *C02F 2303/16* (2013.01)

(58) Field of Classification Search
USPC .......... 210/202, 201, 200, 198.1, 195.1, 194
See application file for complete search history.

(56) References Cited

U.S. PATENT DOCUMENTS

| 4,676,908 | A | * | 6/1987 | Ciepiela et al. .............. 210/638 |
|---|---|---|---|---|
| 4,680,127 | A | | 7/1987 | Edmondson |
| 5,128,049 | A | | 7/1992 | Gatlin |
| 5,180,517 | A | * | 1/1993 | Woods .................. C01B 15/055 |
| | | | | 252/186.27 |
| 2004/0002616 | A1 | * | 1/2004 | Preto ...................... A01N 37/16 |
| | | | | 562/2 |
| 2009/0095472 | A1 | * | 4/2009 | Andersson et al. ....... 166/280.1 |
| 2009/0204419 | A1 | | 8/2009 | Stewart |
| 2013/0008855 | A1 | * | 1/2013 | Vest ........................ C02F 1/288 |
| | | | | 210/670 |

OTHER PUBLICATIONS

European Examination Report for Application No. 11188977.0 dated Jan. 28, 2014.
European Search Official Action for Application No. 11188977.0 dated Nov. 25, 2014.
Annex to the Summons for Oral Proceedings for European Patent Application No. 11188977.0 dated Jul. 7, 2015 with translation.
EPO notice of allowance for European Patent Application No. 11188977.0-1371 /2452923 dated May 20, 2016.
European Search Report for European Application No. EP 16 16 9925 dated Aug. 11, 2016.

* cited by examiner

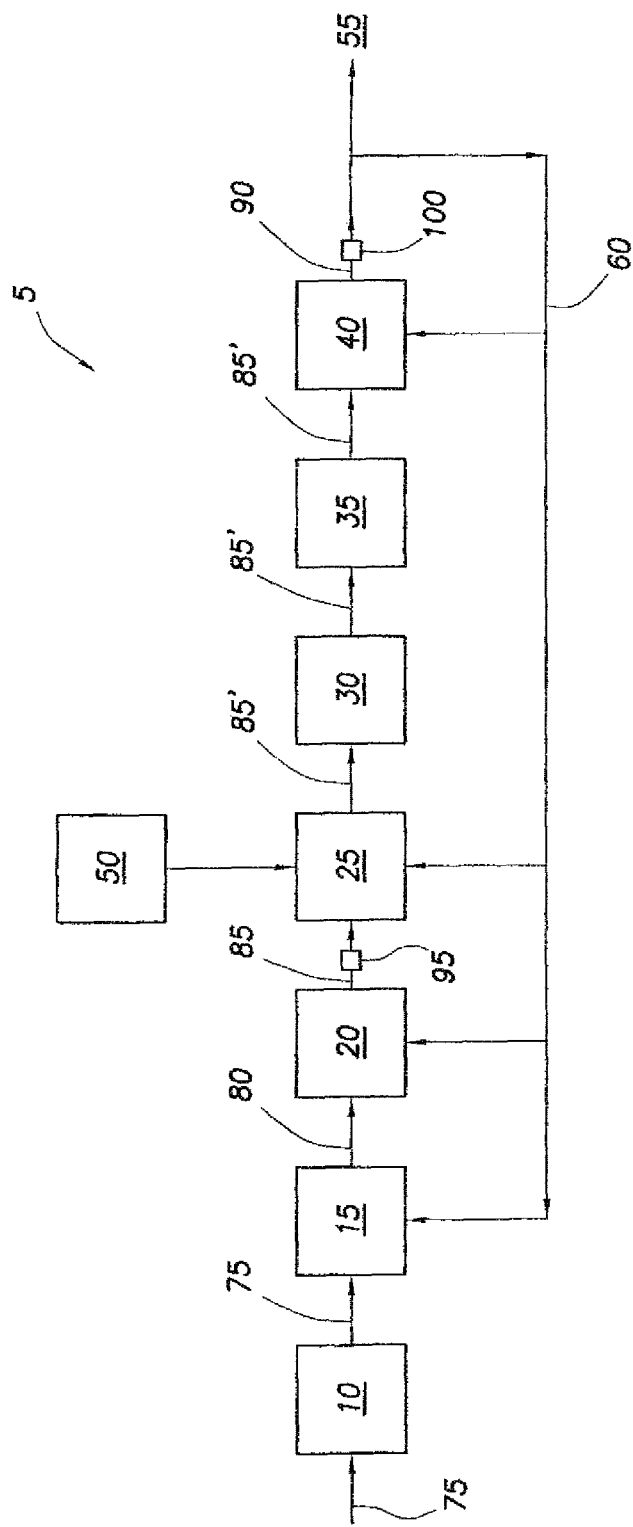

PROCESS FOR DECONTAMINATION OF HAZARDOUS SULFUR COMPOUNDS IN OILFIELD PRODUCED WATERS

CROSS-REFERENCE TO RELATED APPLICATIONS

This application is a non-provisional application that claims the benefit of U.S. Application Ser. No. 61/413,640 filed on Nov. 15, 2010, which is incorporated by reference herein in its entirety.

STATEMENT REGARDING FEDERALLY SPONSORED RESEARCH OR DEVELOPMENT

Not applicable.

BACKGROUND OF THE INVENTION

Field of the Invention

This invention relates to the field of sour water treatment and specifically to decontamination of hazardous sulfur compounds in oilfield produced water with a two-stage treatment process using an iron sponge and a stabilized sodium percarbonate solution.

Background of the Invention

Water returning from producing oilfields (e.g., oilfield produced water) may include hydrogen sulfide, mercaptans, and other hazardous sulfides such as disulfides. This oilfield produced water may originate from the native formation or may be water returned after injection for well stimulation activity. Typically, this oilfield produced water is returned to the formation or treated to reduce hazardous sulfides to a manageable level. Various regulatory agencies may also impose strict guidelines on allowable hazardous sulfides content prior to disposal. Methods have therefore been developed to treat such oilfield produced water.

Conventional water treatment methods include using solid or liquid hydrogen sulfide scavengers, oxidizing chemicals, or physical separation methods such as membrane technology or activated carbon. Solid scavengers such as zinc oxide or iron oxide sponges are typically used for complexing hydrogen sulfide in solid form. Liquid scavengers such as triazine or acrolein are typically used for complexing hydrogen sulfide in liquid form. Oxidizing chemicals typically include nitrites (i.e., sodium nitrite), hypochlorite, potassium or sodium permanganate. Oxidizing chemicals are conventionally used to convert hydrogen sulfide to more harmless forms of sulfur such as water-soluble thiosulfate or sulfate.

Drawbacks to such conventional treatment methods include that while liquid scavengers may be very cost-effective and may tie up hydrogen sulfide as water-soluble compounds that are discharged to wastewater treatment facilities, such facilities are typically inaccessible to oilfield applications. Direct discharge of the treated effluent may therefore be problematic. Further drawbacks include that while oxidizing chemicals may irreversibly convert hydrogen sulfide to harmless water soluble forms of sulfur that may be compatible with effluent discharge, the chemicals themselves may pose significant impact to the environment. Additional drawbacks include that permanganate forms reaction solids such as solid manganese dioxide as a reaction product with hydrogen sulfide. Drawbacks to permanganate also include that it costs more per pound and may not be permitted for disposal without removal of the reaction solids. Permanganate may also be dangerous as any residual hydrocarbon in the water may invoke an exothermic reaction, which is also a drawback to hypochlorite. In addition, while nitrite chemicals may be useful at eliminating hydrogen sulfide, heat may be required for activation (i.e., typically heat accelerates a rather slow oxidation of hydrogen sulfide), which may produce another hazardous chemical (e.g., ammonia) as a reaction product. Moreover, costs are typically higher for oxidizing chemicals than for liquid scavenger chemicals. Drawbacks to zinc salts and oxides include that they may be quite cost prohibitive and produce a solid sulfide-containing residue that may regenerate hydrogen sulfide upon acidification, which may also require a disposal cost. Triazines and acroleins, while typically suitable for wastewater treatment plants, may form compounds that make direct disposal of treated water problematic from a regulatory standpoint. Drawbacks to activated carbon include disposal, which may be a costly option for large amounts of hydrogen sulfide.

Iron sponges have been developed to treat gas streams for removal of hydrogen sulfide. Iron sponges, typically to a lesser extent, have been used for similar treatments in industrial water applications. SULFATREAT® (a registered trademark of M-I L.L.C.) markets a commercial product (SULFATREAT®HC) used for hydrogen sulfide remediation of non-potable water. This product may potentially remove most if not all of the hydrogen sulfide from water. Drawbacks include that over time, the efficiency may drop off as the bed is exhausted. Further drawbacks include that the product may be less efficient at removal of mercaptans.

Consequently, there is a need for an improved method for decontamination of hazardous sulfides in oilfield produced waters.

BRIEF SUMMARY OF SOME OF THE PREFERRED EMBODIMENTS

These and other needs in the art are addressed by a two-stage oil and gas field produced water treatment system for treatment of an oilfield produced water. The oilfield produced water comprises hydrocarbons and hazardous sulfides. In embodiments, the two-stage oil and gas field produced water treatment system includes an oil removal vessel. The oilfield produced water is introduced to the oil removal vessel. In addition, the oil removal vessel removes a portion of the hydrocarbons from the oilfield produced water to provide a reduced oil produced water. The two-stage oil and gas field produced water treatment system also includes an iron sponge. The reduced oil produced water is introduced to the iron sponge. The iron sponge removes a portion of the hazardous sulfides from the reduced oil produced water to provide a reduced sulfide produced water. The two-stage oil and gas field produced water treatment system further includes a stabilized sodium percarbonate solution. The stabilized sodium percarbonate solution is mixed with the reduced sulfide produced water to remove a portion of the hazardous sulfides from the reduced sulfide produced water to provide a treated produced water.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the invention, reference will now be made to the accompanying drawing in which the FIGURE illustrates an embodiment of a two-stage oilfield produced water treatment system.

DETAILED DESCRIPTION OF THE PREFERRED EMBODIMENTS

The FIGURE illustrates an embodiment of two-stage oil and gas field produced water treatment system 5. Two-stage oil and gas field produced water treatment system 5 includes iron sponge 20 (the first stage) and stabilized sodium percarbonate solution 50 (the second stage). In an embodiment, iron sponge 20 is disposed to react with incoming hydrogen sulfide in oilfield produced water 75 to provide a reduced iron sulfide solution having a non-pyrophoric form of iron sulfide. In embodiments, iron sponge 20 provides for complexation of a majority of the hydrogen sulfide component in oilfield produced water 75. In some embodiments, stabilized sodium percarbonate solution 50 is mixed with the remaining hydrogen sulfide in the reduced iron sulfide solution to remove residual hydrogen sulfide by converting the hydrogen sulfide into a salt, which is water soluble. It is to be understood that oilfield produced water 75 refers to water that is a by-product of oil and gas recovery operations and that contains hydrocarbons, solids (both dissolved and undissolved solids) and hazardous sulfides. Hazardous sulfides may include any hazardous sulfides typically found in oilfield produced waters. Without limitation, examples of hazardous sulfides include hydrogen sulfides, disulfides, mercaptans, and the like.

In some embodiments as shown, oilfield produced water 75 is provided to two-stage oil and gas produced water treatment system 5. In an embodiment, oilfield produced water 75 is contained in one or more tanks 10. Tank 10 may include any vessel suitable for containing oilfield produced water 75. In embodiments, tank 10 is a well test tank in which oilfield produced water 75 is tested (i.e., tested to determine the amount of oil (e.g., ppm) in water). In an embodiment as shown, oilfield produced water 75 is supplied from tank 10 to oil removal vessel 15 in which a portion or substantially all of the hydrocarbons in oilfield produced water 75 are removed. Oil removal vessel 15 may include any vessel suitable for removing a portion or substantially all of the hydrocarbons (e.g., oil) from oilfield produced water 75. Without limitation, examples of suitable oil removal vessels 15 include gas flotation units, heat separation units, skimming pits, or any combinations thereof. In an embodiment, oil removal vessel 15 is a gas flotation unit. A gas flotation unit refers to a unit in which a gas (e.g., carbon dioxide) is bubbled through a water having suspended oil, with the water and oil typically separating at or near the top of the unit. In some embodiments, the gas flotation unit has a skimmer that removes the oil from the unit. Oil removal vessel 15 may remove any desired amount of hydrocarbons from oilfield produced water 75. In an embodiment, oil removal vessel 15 provides reduced oil produced water 80 containing between about 20 ppm and about 50 ppm hydrocarbons, alternatively between about 25 ppm and about 35 ppm hydrocarbons, and alternatively about 29 ppm hydrocarbons.

As shown, embodiments include reduced oil produced water 80 from oil removal vessel 15 being introduced to iron sponge 20. Iron sponge 20 is a vessel containing a sponge material comprising a substrate with a transition metal oxide coating. Any suitable substrate for use with an iron sponge may be used. Without limitation, examples of substrates include clay and wood. In an embodiment, the substrate is a clay substrate. Any suitable transition metal oxide coating may be used. In an embodiment, the transition metal oxide is zinc oxide, iron oxide, or any combinations thereof. In embodiments, the transition metal oxide is iron oxide. In an embodiment in which the coating is iron oxide, the hydrogen sulfide in reduced oil produced water 80 reacts with the iron oxide to produce iron sulfide. Without limitation, the iron sulfide is produced on sponge material. Further, without limitation, a commercial example of the sponge material is SULFATREAT®, which is a registered trademark of M-I L.L.C. In some embodiments, pressure is added to reduced oil produced water 80 when introduced to iron sponge 20, which facilitates diffusion of reduced oil produced water 80 through iron sponge 20. Iron sponge 20 may be operated to remove any desired portion of the hazardous sulfides. In embodiments, iron sponge 20 is operated to remove between about 80% and about 98% of hazardous sulfides from reduced oil produced water 80, alternatively between about 85% and about 95% of hazardous sulfides from reduced oil produced water 80, further alternatively between about 90% and about 98% of hazardous sulfides from reduced oil produced water 80, and further alternatively about 90% of hazardous sulfides from reduced oil produced water 80. Iron sponge 20 reduces the amount of hazardous sulfides in reduced oil produced water 80 to provide reduced sulfide produced water 85.

Stabilized sodium percarbonate solution 50 is added to reduced sulfide produced water 85. Stabilized sodium percarbonate solution 50 may be added to reduced sulfide produced water 85 by any suitable means. In an embodiment as shown, stabilized sodium percarbonate solution 50 is added to reduced sulfide produced water 85 via stabilized sodium percarbonate solution valve 25. In an embodiment, stabilized sodium percarbonate solution 50 includes sodium percarbonate and a liquid solution that includes water, a stabilizer, and an acid. In embodiments, stabilized sodium percarbonate solution 50 has a strength retention from about 90% to about 99%, alternatively from about 92% to about 97%, and alternatively about 96%. It is to be understood that strength retention refers to the maintenance of active sodium percarbonate in solution. Any stabilizer suitable for stabilizing the sodium percarbonate solution (e.g., the solution of sodium percarbonate and the liquid) may be used. In embodiments, the stabilizer is a peroxide stabilizer. In some embodiments, the stabilizer includes nitrilotrimethylenephosphonate (NTMP); tartrazine; 1-hydroxyethylidene-1,1 diphosphonic acid; or any combinations thereof. In an embodiment, the stabilizer comprises NTMP, tartrazine, or any combinations thereof. In some embodiments, the stabilizer is tartrazine. The acid may be any acid suitable to bring the sodium percarbonate to a neutral or desired pH level. In an embodiment, the acid comprises citric acid, phosphoric acid, or any combinations thereof. In some embodiments, the acid is phosphoric acid. In an embodiment, the liquid solution contains from about 0.01 wt. % to about 0.5 wt. % of peroxide stabilizer (i.e., tartrazine), alternatively from about 0.01 wt. % to about 0.05 wt. % peroxide stabilizer (i.e., tartrazine), and alternatively about 0.05 wt. % peroxide stabilizer (i.e., tartrazine). The liquid solution contains a sufficient amount of acid to maintain the pH of the liquid solution below about 7.0 pH, alternatively below about 6.5 pH, and alternatively from about 5.5 pH to about 6.5 pH. In an embodiment, the acid is phosphoric acid. In such embodiments, the phosphoric acid may be any suitable percent phosphoric acid. For instance, the phosphoric acid may be 75% phosphoric acid or 85% phosphoric acid. The liquid solution may contain any suitable amount of the acid to maintain the desired pH level. In embodiments, the liquid solution contains from about 4.0 vol. % phosphoric acid to about 8.0 vol. % phosphoric acid, alternatively from about 5.0 vol. % phosphoric acid to about 7.0 vol. % phosphoric acid, and alternatively about 6.0 vol. % phosphoric acid. In embodiments in which the acid is citric acid, the liquid solution contains citric acid in amounts that maintain pH at levels about commensurate with those in phosphate-buffered solutions. Without limitation, a commercial example of stabilized sodium percarbonate solution 50 is SWT-K13™, which is a trademark of United Laboratories International, LLC.

In embodiments, a sufficient amount of stabilized sodium percarbonate solution 50 is added to reduced sulfide produced water 85 to remove a portion or substantially all of the hazardous sulfides in reduced sulfide produced water 85. In embodiments, a sufficient amount of stabilized sodium percarbonate solution 50 is added to reduced sulfide produced water 85 to reduce the amount of hazardous sulfides in stabilized sodium percarbonate solution 50 to between about 1 ppm and about 20 ppm, alternatively between about 1 ppm and about 10 ppm, and alternatively between about 1 ppm and about 5 ppm, further alternatively less than about 4 ppm, and alternatively less than about 1 ppm. After mixing with reduced sulfide produced water 85 to reduce the amount of hazardous sulfides, embodiments of two-stage oil and gas field produced water treatment system 5 include providing reduced sulfide produced water 85' to formation material removal device 35. In alternative embodiments (not shown), reduced sulfide produced water 85' is provided to disposal 55 or an alternative destination.

In an embodiment as shown in the FIGURE, formation material removal device 35 removes a portion or substantially all of the formation materials and other solids from reduced sulfide produced water 85'. Formation materials refer to seashells, sand, rocks, and the like. Formation material removal device 35 may include any device or process suitable for removing solids from a liquid. Without limitation, examples of suitable formation material removal devices 35 include cartridge filters, bag filters, screen filters, or any combinations thereof. In an embodiment, formation material removal device 35 comprises cartridge filters. Any cartridge filters suitable for removing formation materials and other solids may be used. In embodiments, cartridge filters comprise corrugated materials. In some embodiments, pressure is added to reduced sulfide produced water 85'. In an embodiment as shown, pump 30 provides pressure to reduced sulfide produced water 85' before introduction to formation material removal device 35.

As shown in the FIGURE, embodiments of two-stage oil and gas field produced water treatment system 5 include introducing reduced sulfide produced water 85' to hydrocarbon removal device 40. In embodiments as shown, reduced sulfide produced water 85' is introduced to hydrocarbon removal device 40 after treatment by formation material removal device 35. Without limitation, reduced sulfide produced water 85' is treated by formation material removal device 35 prior to treatment by hydrocarbon removal device 40 because the removal of remaining solids by formation material removal device 35 facilitates the operation of hydrocarbon removal device 40. In embodiments, hydrocarbon removal device 40 removes trace hydrocarbons from reduced sulfide produced water 85'. Hydrocarbon removal device 40 includes any device suitable for removing trace hydrocarbons from reduced sulfide produced water 85'. Without limitation, examples of suitable hydrocarbon removal devices 40 include carbon filters, clay, sawdust, or any combinations thereof. In an embodiment, hydrocarbon removal device 40 comprises carbon filters. Any suitable type of carbon filter may be used. In some embodiments, the type of carbon filter used may be selected based on the efficiency of oil removal vessel 15. In embodiments, hydrocarbon removal device 40 treats reduced sulfide produced water 85' to provide treated produced water 90 having between about 1 ppm and about 100 ppm hydrocarbons, alternatively between about 1 ppm and about 50 ppm hydrocarbons.

In an embodiment of operation of two-stage oil and gas produced water treatment system 5, oilfield produced water 75 is introduced to tank 10 (e.g., well test tank). In such an embodiment, the composition of oilfield produced water 75 is determined. From tank 10, oilfield produced water 75 is introduced to oil removal vessel 15 (e.g., gas flotation unit). Oil removal vessel 15 is operated to remove a desired amount of hydrocarbons from oilfield produced water 75 and thereby provide reduced oil produced water 80, which is then introduced to iron sponge 20. Iron sponge 20 is operated to remove a desired amount of hazardous sulfides from reduced oil produced water 80. In an embodiment, the effectiveness of iron sponge 20 at removing hazardous sulfides is determined. In embodiments, the effectiveness is determined by sponge measurement device 95, which measures reduced sulfide produced water 85 content before addition of stabilized sodium percarbonate solution 50. Sponge measurement device 95 may be any device suitable for measuring the content of a liquid. In embodiments, sponge measurement device 95 is a sensor. Any suitable sensor may be used. In an embodiment, the sensor is a membrane/lead acetate sensor. In embodiments, the analysis by sponge measurement device 95 is automatic. In alternative embodiments, the analysis by sponge measurement device 95 is manual. For instance, such manual analysis may be by silver titration methods. In embodiments, the content measurement of reduced sulfide produced water 85 by sponge measurement device 95 includes measurements (i.e., amount, wt. %, and the like) of hazardous sulfides in reduced sulfide produced water 85. In an embodiment, such content measurement is used to determine the amount of stabilized sodium percarbonate solution 50 to add. For instance, in embodiments, two-stage oil and gas field produced water treatment system 5 has a target hazardous sulfide content in reduced sulfide produced water 85'. To achieve such target, when sponge measurement device 95 determines that the hazardous sulfide content of reduced sulfide produced water 85 exiting iron sponge 20 is greater than such target, a sufficient amount of stabilized sodium percarbonate solution 50 is added to reduced sulfide produced water 85 to reduce the hazardous sulfide content to about at or below the desired target.

In embodiments, the amount of hazardous sulfides in reduced sulfide produced water 85 is determined (i.e., by the determination in tank 10 of the content of oilfield produced water 75). Embodiments of two-stage oil and gas field produced water treatment system 5 include comparing the hazardous sulfide content of reduced sulfide produced water 85 exiting iron sponge 20 to the hazardous sulfide content of reduced oil produced water 80 entering iron sponge 20 to determine and monitor the effectiveness of iron sponge 20 in removing hazardous sulfides. In an embodiment, two-stage oil and gas field produced water treatment system 5 includes a threshold for removal of hazardous sulfides by iron sponge 20. In embodiments, such threshold includes a determination of the percentage of hazardous sulfides removed by iron sponge 20. Since the hazardous sulfide content of reduced oil produced water 80 entering iron sponge 20 and that of reduced sulfide produced water 85 exiting iron sponge 20 are determined, the amount and percent removal by iron sponge 20 may be determined. The threshold may be any desired removal percent. In embodiments, the threshold is removal of about 95 percent or higher, alternatively about 90 percent or higher, and alternatively about 50 percent or higher of hazardous sulfides. In an embodiment, the threshold is removal of about 90 percent or higher of hazardous sulfides. When the percentage of hazardous sulfides removed is below the threshold, iron sponge 20 may be taken off-line, with stabilized sodium percarbonate solution 50 added to reduced oil produced water 80 in increased amounts to remove the amount of hazardous sulfides that were removed by iron sponge 20 and to achieve the target. In such an embodiment, with iron sponge 20 off-line, stabilized sodium percarbonate solution 50 is performing both stages of hazardous sulfide removal. While off-line, maintenance is performed on iron sponge 20. When the maintenance is complete, iron sponge 20 is placed back in-line to reduce the hazardous sulfide content in reduced oil produced water 80 (i.e., the first stage) with stabilized sodium percarbonate solution 50 reducing the hazardous sulfide content of reduced sulfide produced water 85 (i.e., the second stage).

Maintenance on iron sponge 20 may be accomplished by any suitable method. In an embodiment, maintenance includes a sponge replacement method. The sponge replacement method includes replacing the sponge material. In such an embodiment, the sponge material is removed from iron sponge 20 and sent to a desired location such as a landfill. Fresh sponge material may then be added to iron sponge 20. In another embodiment, the maintenance is a limited regeneration method. In such an embodiment of a limited regeneration method, air is introduced to iron sponge 20 with the air contacting the sponge material with iron sulfide on its exterior. The air regenerates the iron sulfide to form iron oxide and solid sulfur. In some embodiments, the maintenance is a total regeneration method. In such embodiments of a total regeneration method, stabilized sodium percarbonate solution 50 is introduced to iron sponge 20 with stabilized sodium percarbonate solution 50 contacting the sponge material with iron sulfide on its exterior. Stabilized sodium percarbonate solution 50 regenerates the iron sulfide to water and iron oxide. In some embodiments, repeated maintenance may include the limited regeneration method until the sulfur coats a portion or all of the surface of the sponge material. Without being limited by theory, sulfur coating the surface (i.e., the iron oxide surface) may limit conversion of the hazardous sulfides (i.e., hydrogen sulfide conversion). In such instances when sulfur coats a portion or all of the surface, the sponge replacement method and/or the total regeneration method may then be used.

Further, in an embodiment of operation of two-stage oil and gas field produced water treatment system 5, reduced sulfide produced water 85' is provided to formation material removal device 35 (i.e., cartridge filter) via pump 30. Solids are removed by formation material removal device 35, and reduced sulfide produced water 85' is then introduced to hydrocarbon removal device 40 (i.e., carbon filter) in which trace hydrocarbons are removed from reduced sulfide produced water 85' to provide treated produced water 90. In an embodiment, the content of treated produced water 90 is determined. If the content of treated produced water 90 is above a desired final target content, embodiments include recycling treated produced water 90. The final target has a maximum amount (i.e., in ppm) of hydrocarbons (e.g., oil) and/or hazardous sulfides (e.g., hydrogen sulfide). In embodiments, the hazardous sulfide content of treated produced water 90 is determined by recycle measurement device 100, which measures treated produced water 90 hazardous sulfide content. Recycle measurement device 100 may be any device suitable for measuring the content of a liquid. In embodiments, recycle measurement device 100 is a sensor. Any suitable sensor may be used. In an embodiment, the sensor is a membrane/lead acetate sensor. In embodiments, the analysis by recycle measurement device 100 is automatic. In alternative embodiments, the analysis by recycle measurement device 100 is manual. For instance, such manual analysis may be by silver titration methods. Any suitable device (not illustrated) may be used to determine the hydrocarbon content of treated produced water 90 such as, without limitation, infrared sensors, ultra violet turbidity measurements, and the like.

In an instance in which the content of treated produced water 90 is determined by recycle measurement device 100 to have a hazardous sulfide content greater than the final target for hazardous sulfides, embodiments of two-stage oil and gas field produced water treatment system 5 include recycling treated produced water 90 as recycle stream 60. In such embodiments, recycle stream 60 is recycled and re-injected with stabilized sodium percarbonate solution 50 and mixed to be included with reduced sulfide produced water 85. In an embodiment, recycle stream 60 is re-injected at stabilized sodium percarbonate solution valve 25 with stabilized sodium percarbonate solution 50. In alternative embodiments, recycle stream 60 is re-injected into iron sponge 20. In embodiments, whether recycle stream 60 is recycled to iron sponge 20 or to re-injection with stabilized sodium percarbonate solution 50 is determined based upon how much higher the hazardous sulfide content is than the final target. In embodiments, in instances in which the hazardous sulfide content is greater than 100 ppm above the final target, recycle stream 60 is recycled to iron sponge 20. In such embodiments, in instances in which the hazardous sulfide content in less than 100 ppm above the final target, recycle stream 60 is recycled to re-injection with stabilized sodium percarbonate solution 50.

In an instance in which the content of treated produced water 90 is determined to have a hydrocarbon content greater than the final target for hydrocarbons, embodiments of two-stage oil and gas field produced water treatment system 5 include recycling treated produced water 90 as recycle stream 60. In such embodiments, recycle stream 60 is recycled and re-injected to oil removal vessel 15 or hydrocarbon removal device 40. In embodiments, whether recycle stream 60 is recycled to oil removal vessel 15 or to hydrocarbon removal device 40 is determined based upon how much higher the hydrocarbon content is than the final target. In embodiments, in instances in which the hydrocarbon content is greater than 100 ppm above the final target, recycle stream 60 is recycled to oil removal vessel 15. In such embodiments, in instances in which the hydrocarbon content in less than 100 ppm above the final target, recycle stream 60 is recycled to hydrocarbon removal device 40.

In some embodiments, two-stage oil and gas field produced water treatment system 5 is automated. It is to be understood that two-stage oil and gas field produced water treatment system 5 is not limited to the embodiments as shown in the FIGURE. In alternative embodiments (not illustrated), two-stage oil and gas field produced water treatment system 5 does not have tank 10. In other alternative embodiments (not illustrated), two-stage oil and gas field produced water treatment system 5 does not have pump 30, formation material removal device 35, and/or hydrocarbon removal device 40. In alternative embodiments (not illustrated) in which two-stage oil and gas field produced water treatment system 5 does not have pump 30, formation material removal device 35, and hydrocarbon removal device 40, treated produced water 90 is reduced sulfide produced water 85'. In other alternative embodiments (not illustrated), two-stage oil and gas field produced water treatment system 5 does not have oil removal vessel 15. In such alternative embodiments, oilfield produced water 75 is introduced to iron sponge 20, and/or oilfield produced water 75 has hydrocarbons removed elsewhere to provide reduced oil produced water 80, which is then introduced to iron sponge 20.

To further illustrate various illustrative embodiments of the present invention, the following example is provided.

EXAMPLE

This example was to measure the reaction exotherm between a sour water and a stabilized sodium percarbonate solution. SWT-K13™ was the stabilized sodium percarbonate solution used.

A sour water assayed at 10,200 ppm hydrogen sulfide was used. 11 mls of this sour water was diluted to 100 mls in a capped bottle. 2 mls of oil (motor oil) was added to the 100 mls of sour water. 1 ml of a dispersant was added to disperse the motor oil. The SWT-K13™ was assayed at 9.60% active.

100 mls of sour water was treated with 33 mls of SWT-K13™ by placement in a constant temperature bath at 60° C. After an hour, both liquids had reached a stable temperature of 58° C. The SWT-K13™ was added to the sour water, and a temperature rise was monitored. The temperature of the treated sour water rose from 58° C. to 62° C. within two minutes and thereafter remained stable.

Although the present invention and its advantages have been described in detail, it should be understood that various changes, substitutions and alterations may be made herein without departing from the spirit and scope of the invention as defined by the appended claims.

What is claimed is:

1. A two-stage oil and gas field produced water treatment system for treatment of an oilfield produced water, wherein the oilfield produced water comprises hydrocarbons and hazardous sulfides, the system comprising:
    an oil removal vessel, wherein the oil removal vessel is capable of containing oilfield produced water introduced to the oil removal vessel, and wherein the oil removal vessel is capable of removing a portion of the hydrocarbons from the oilfield produced water to provide a reduced oil produced water;
    an iron sponge, wherein the iron sponge comprises a clay substrate; wherein the iron sponge is capable of removing a portion of the hazardous sulfides from the reduced oil produced water to provide a reduced sulfide produced water; and
    a stabilized sodium percarbonate solution comprising tartrazine; wherein the stabilized sodium percarbonate solution is mixed with the reduced sulfide produced water to provide a treated produced water.

2. The two-stage oil and gas field produced water treatment system of claim 1, wherein the iron sponge removes between about 80% and about 98% of the hazardous sulfides from the reduced oil produced water.

3. The two-stage oil and gas field produced water treatment system of claim 1, wherein the stabilized sodium percarbonate solution reduces the hazardous sulfides in the reduced sulfide produced water to between about 1 ppm and about 20 ppm.

4. The two-stage oil and gas field produced water treatment system of claim 1, further comprising a sponge measurement device, wherein the sponge measurement device determines the amount of hazardous sulfides in the reduced sulfide produced water.

5. The two-stage oil and gas field produced water treatment system of claim 1, further comprising a formation material removal device, wherein the formation material removal device removes formation materials from the reduced sulfide produced water.

6. The two-stage oil and gas field produced water treatment system of claim 1, further comprising a hydrocarbon removal device, wherein the hydrocarbon removal device removes hydrocarbons from the reduced sulfide produced water.

7. The two-stage oil and gas field produced water treatment system of claim 1, wherein the system further comprises the treated produced water.

* * * * *